INVENTOR.
EUGENE A. GAWRONSKI

July 7, 1970 E. A. GAWRONSKI 3,518,796
APPARATUS FOR GRINDING AND POLISHING GLASS ARTICLES
Filed Sept. 1, 1967 2 Sheets-Sheet 2
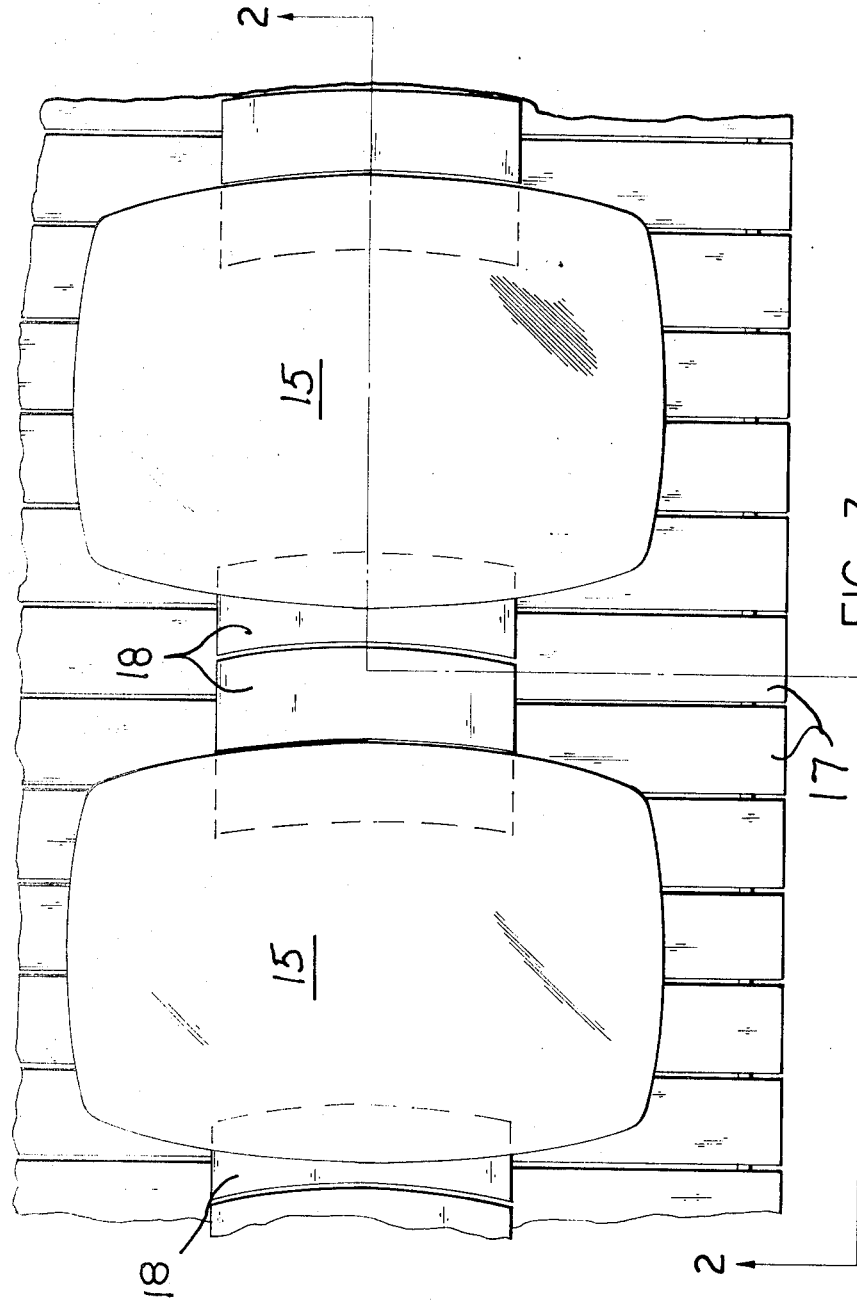
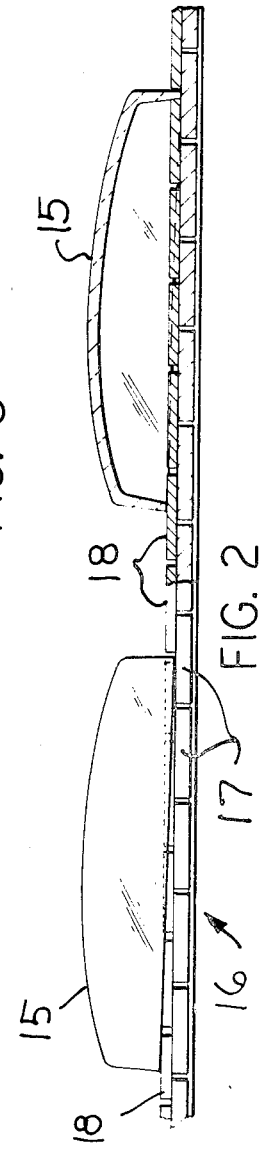
INVENTOR.
EUGENE A. GAWRONSKI
BY E. J. Holler &
W. A. Schaich
ATTORNEYS

United States Patent Office

3,518,796
Patented July 7, 1970

3,518,796
APPARATUS FOR GRINDING AND POLISHING GLASS ARTICLES
Eugene A. Gawronski, Columbus, Ohio, assignor to Owens-Illinois, Inc., a corporation of Ohio
Filed Sept. 1, 1967, Ser. No. 665,011
Int. Cl. B24b *19/00, 37/00*
U.S. Cl. 51—76                                2 Claims

ABSTRACT OF THE DISCLOSURE

Apparatus for grinding and polishing glass articles, and more particularly, large curved surfaces of glass articles such as television picture tube face plates and other glass components useful in both the electronics and optical industries. Workpieces, for example, television picture tube face plates, are advanced below a series of downwardly biased buffing drums to which abrasive-containing fluid is supplied by a spray header. Such workpieces are carried by an endless conveyor comprising a plurality of flat, parallel, elongated plates. Support members are attached to the conveyor plates and are adapted to hold the leading edge of a workpiece between adjacent, curved vertical surfaces and the trailing edge of the workpiece on a horizontal surface thereof such that the leading edge is disposed at a lower elevation than the trailing edge. Collection and return apparatus is provided for re-using the fluid and a second spray header is provided for finally rinsing the abraded workpiece.

BACKGROUND OF THE INVENTION

This invention relates to an apparatus suitable for use in grinding and polishing large curvo-convex surfaces of glass workpieces utilized in the formation of hollow glass articles, for example, those used as face plates in providing the viewing screens of television picture tube envelopes.

Glass face plates of television picture tube envelopes conventionally have relatively thick sidewalls which thereby pose a difficult problem in molding such large glass viewing surfaces to the desired shape. Both during press-forming of the face plates and during subsequent after-operations, it is possible for deviation from the desired surface contour and surface damage to occur. Such surface deviation and damage adversely affect the optical characteristics of the face plate, and it is conventional practice to remove such faults which may occur, such as localized depressions, scratches on the surface, seeds and/or blisters at or near the surface, and the like, by a combined grinding and polishing process. Removal of such defects is necessary to eliminate their being visible under certain conditions during operation of the completed picture tube. This is a definite requirement in the manufacture of light-transmitting precision parts of optical quality.

Grinding and polishing has previously been performed by using either deformable discs or deformable rolls which engage the curved face plate during grinding to exert a substantial downward or normal force thereupon. Normally a grinding medium such as an abrasive-containing fluid is employed intermediate the glass surface and the grinding and polishing rolls or discs. In the case of large-size automatic polishing machines, each glass article has previously been retained on a special carrier or jig which supports the hollow glass face plate by restraining its diametrically-opposed edges. The special carrier has conventionally been mounted in series on a conveyor belt mechanism having an upper reach adapted to pass beneath a series of grinding and polishing rolls in order to remove the visible surface flaws from the face plates.

In order to accomplish the grinding and polishing of face plates, the prior art has heretofore mounted the glass articles in horizontal relation during their continuous movement beneath the series of grinding and polishing rolls mounted on a lineal automatic machine. In view of the fact that the rolls are generally pivotally mounted to permit their delivering a controlled downward or normal force upon the glass surface, it has been extremely difficult to obtain uniform and acceptable surface finishing of the entire curvo-convex surface of the face plates. This has been true whether the face plates be mounted on special carriers or residing on a flat belt such as disclosed in U.S. Pat. 2,715,796 to Beard et al., or U.S. Pat. 2,856,737 to Evans, both of which disclose horizontal conveyor belts for retaining face plates during grinding and polishing operations. In these disclosures, the large peripheral edge of the face plate is retained in horizontal relation beneath either an abrading belt or rolls, and it is extremely difficult to assure uniform and acceptable finishing of the upwardly-facing curved glass surface. It is also highly desirable that the article retention mechanism of a continuous-type polishing machine be adapted to processing a wide variety of shapes and sizes of face plates without costly stoppage or conversion of the polishing apparatus. Further, the prior art of mounting face plates in horizontal relation has encountered problems in obtaining uniformity of surface finishing, especially in finishing certain sizes and shapes of face plates. Such variations commonly occur between the leading and trailing edges of the face plates due to their arrangement for passage through the automatic polishing equipment.

Accordingly, it is an object of the present invention to provide an apparatus for processing large hollow glass articles having curved surfaces to facilitate their uniform surface finishing while progressively moved through the apparatus.

Another object of the present invention is to provide apparatus for positively restraining a hollow glass article in inclined relation to permit its extensive upwardly-facing curved surface to be ground and polished with more uniform treatment between leading and trailing edges when progressively conveyed through the polishing apparatus.

Another object of this invention is to provide a supporting and conveying mechanism for widely diverse sizes and shapes of television picture tube face plates to facilitate their being accurately ground and polished by a series of transversely-disposed buffing drums adapted to contact the article viewing surfaces.

A still further object of this invention is to provide an articulated conveyor belt having a continuous series of similarly-shaped support members mounted thereon, each pair being adapted to receive one edge portion of large dome-shaped glass articles, to obtain improved uniform treatment in grinding and polishing such face plates.

A still further object of this invention is to provide an apparatus for grinding and polishing curved surfaces of hollow glass articles during their conveyance in inclined retention facing the direction of travel, the forwardmost edge being positively retained to facilitate utilization of deformable buffing drums or rolls in combination with an abrasive-containing fluid.

On the accompanying drawings:

FIG. 2 is a fragmentary enlarged vertical sectional view of one portion of the apparatus illustrating the inclined arrangement of the articles retained by the apparatus conveyor belt shown in FIG. 1.

FIG. 3 is a fragmentary top view showing the article supporting elements of the conveyor belt portion of the apparatus.

Figure 1:
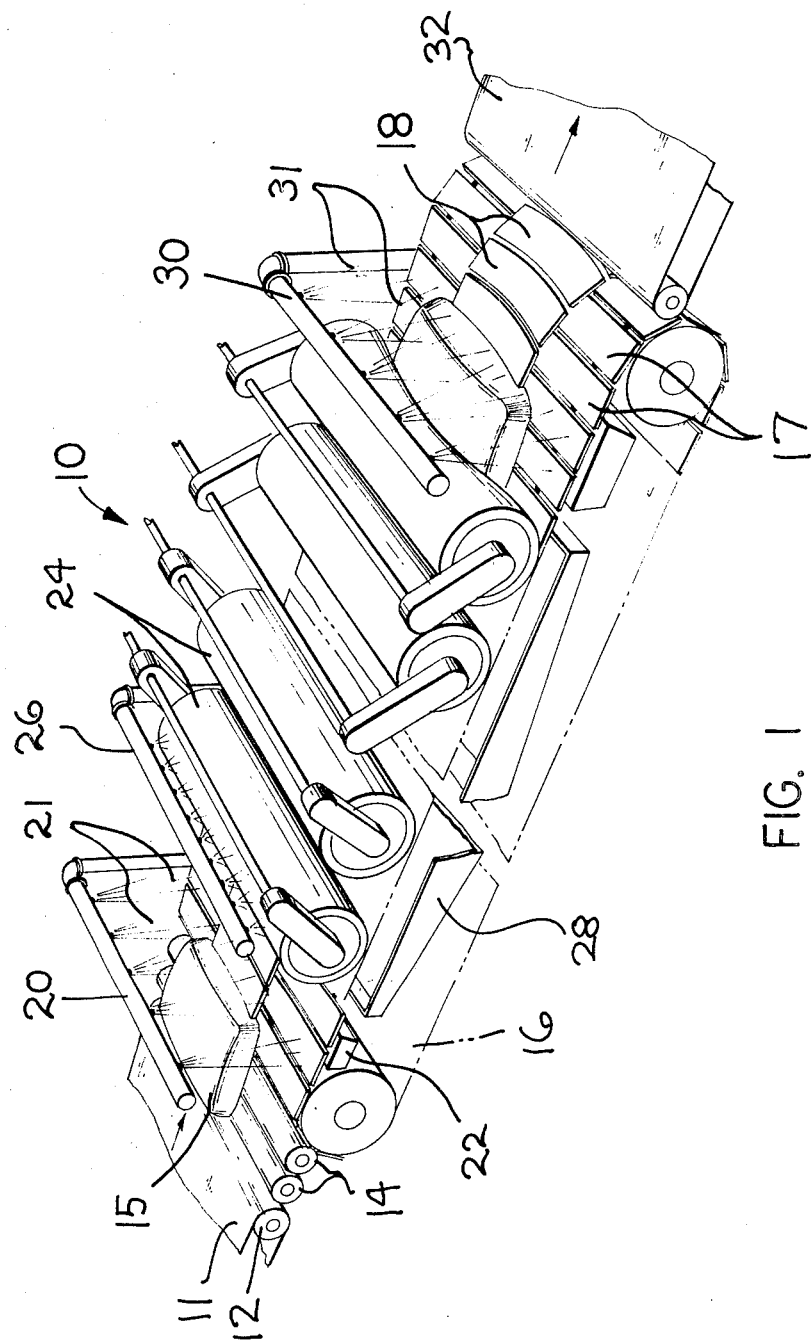
FIG. 1 is a perspective view of the grinding and polishing apparatus employing a preferred form of article retention mechanism in accordance with the present invention.

Referring to the drawings in detail, the overall grinding and polishing apparatus is designated by the numeral 10 in FIG. 1. This perspective drawing has been reduced in detail so that only the essential components of the apparatus are shown schematically.

An article conveyor 11, illustrated at the left side of FIG. 1 carries the television tube face plates or other similar glass articles from previous processing or forming equipment to the grinding and polishing apparatus 10. The end support roller 12 of the incoming conveyor 11 is positioned substantially coplanar with or slightly above the receiving end of the polishing apparatus 10. As glass articles 15 arrive at the discharge end of article conveyor 11, the forwardly-projecting portion of the article is suspended in air so long as its center of gravity remains over the supporting surface of incoming conveyor 11. The forwardmost edge of the article then approaches and is received by the incoming end of articulated conveyor belt 16 of the polishing apparatus. Delivery of the incoming articles onto the upper reach of belt 16 of the polishing apparatus is arranged so that the forwardmost edge of each article, as it is delivered thereupon, is engaged by the article retaining construction of such belt 16. A pair of rubber retaining rolls 14 may be interposed between the discharge end of incoming conveyor 11 and the receiving end of conveyor belt 16 to permit precise automatic loading of belt 16.

Articulated belt 16 is comprised of a series of elongated flat plates 17 which extend throughout the entire length of the endless conveyor. In a central region of the conveyor belt and intermediate the slots which occur between adjacent plates 17 is mounted a series of smaller similarly-shaped support or lug members 18, each having concave and convex parallel surfaces on their vertical surfaces extending transversely to the line of travel of the conveyor. The spacing between adjacent support members 18 and the configuration of the slot or recess between adjacent members allows the leading edge of the article, such as a television face plate, to drop to a lower level upon its delivery to the incoming end of the conveyor. Support members 18 have dimensions whereby a group of such members requires the trailing edge of the glass article to rest on the top surface of another member as shown in FIGS. 2 and 3. Thus, the article is upwardly inclined in the direction of travel of the conveyor so that during grinding and polishing operations, a more uniform finishing over the entire exterior curved viewing surface of the article is obtained.

As the articles are conveyed from the incoming conveyor 11 to the grinding and polishing machine, the leading edge of the article may be retained momentarily by the set of rubber rollers 14 which are arranged to automatically line up the forwardmost edge of the article with a complemental recess between adjacent support members 18, thereby allowing such edge portion to drop into the recess when the forwardmost edge of the article is lowered. The article is then pulled away from the retainer rollers and is fed into the subject apparatus. The trailing edge of the article is elevated in all cases to the upper surface of a support member 18 and the center-line of the article is disposed parallel with the line of travel. A preferred arrangement is to bolt support members 18 to one elongated plate 17 employing two or more bolts (not shown) thereby facilitating the angular movement of conveyor belt 16 over its end sprockets. The lug members 18 thus separate from the article edge at the sprockets.

At least the upper surfaces of plate members 17 and all of the ware-contacting surfaces of support members 18 are covered with an elastomeric material such as rubber having a hardness in the range of 60 to 80 durometers. Obviously, the conveyor article-supporting elements may be comprised of other materials which prevent surface damage to glassware, and particularly the planar sealing edge portion adapted to be sealed to the funnel member of a cathode-ray tube envelope must be protected against damage or abrasion.

The articles which are received by belt 16 and thereby disposed in inclined relation are initially moved under a rinsing header 20 which is transversely positioned over and above the belt and articles supported thereupon. A series of discharge jets of water 21 or other rinsing fluid are directed downwardly to deliver the rinsing fluid upon and around the articles passing therebeneath. The rinsing fluid, following rinsing of the upwardly-facing surfaces of the articles, is then collected in a drain pan or trough 22 located beneath the conveyor belt. It is preferred that belt 16 have sufficient reticulations and spaced between adjacent elongated plates 17 to permit passage of the rinsing fluid therethrough so that it may be readily collected in the drain pan for re-use.

The articles 15, such as face plates, are advanced from left-to-right as shown in FIG. 1 by advancing movement of the conveyor belt to pass under a series of cylindrically-shaped buffing drums 24 which are mounted in transverse array over and above belt 16. Buffing drums 24 are of conventional design and so suspended in pivotal relation that a uniform downward thrust is placed upon the curved upper surface of the articles 15 during their passage therebeneath. The downwardly biasing force delivered by each drum 24 results from a conventional cantilevered suspension whereby the weight of the supporting frame, the drum and driving motor, along with a tension spring, are adapted to deliver a prescribed amount of downward force. The downward force is controlled to ensure that equal positive pressure is imparted to all areas of the convexly-curved article surface to obtain a uniform polishing action. The pivotal mounting of the buffing drums is not shown in complete detail since it is considered to be of conventional design.

The buffing action of drums 24 which are rotated in contact with the glass surface is aided by a conventional polishing composition such as an aqueous suspension of cerium oxide or a pumice which is dispensed over the surface of the drum by a dispensing header 26. Both cerium oxide and pumice are well known abrasives which are widely used in the grinding and polishing of glass surfaces. Normally an aqueous solution of the abrasive material is employed, being delivered continuously to the rotating exterior surface of the buffing drum by a recirculatory system, the buffing drum normally having a soft felt-covered exterior surface. Conveyor belt 16 of the present invention is of particular utility in allowing passage therethrough of the spent abrasive-containing fluid medium following its use. The spent abrasive solution is collected and recirculated for re-use in an essentially-closed system. The open characteristics of the conveyor belt permit the abrasive solution to pass therethrough following its use in conjunction with the buffing rolls. The spent solution is collected in a trough 28 underlying the upper reach of conveyor belt 16 flowing from the trough to a pumping station where it is agitated and returned to dispensing header 26. Each of the buffing drums 24 may have an individual spray header positioned thereabove as shown in the first drum on the left side of FIG. 1; however, only one drum is shown so equipped in the drawing to simplify same.

The hollow glass articles such as face plates pass progressively while retained in upwardly inclined relation through the buffing zone of the apparatus. The buffing or polishing action is delivered by a plurality of such buffing elements which may number as many as eight to twenty similar rolls. The downward force applied by the drum and its rotational movement, along with the intermediate layer of abrasive-containing fluid which is delivered therebetween, are varied as known in the art to achieve optimum results on the convexly-curved exterior surface of the article being polished.

Subsequent to grinding and polishing the upper surface of the articles, the articles are then passed through a rinsing stage as shown on the right-hand side of FIG. 1. A rinsing header 30 delivers a rinsing medium such as water under pressure through a series of discharge jets 31 which are directed downwardly to impinge the newly-polished curved surfaces of the glass articles. Usually, a rather small volume of water in the form of a spray is required to remove all traces of grinding compound without dilution of the slurry. Rinse water readily drains from the glass articles and passes through openings provided in conveyor belt 16 for its collection and re-use, if desired.

As the newly-finished glass articles discharge from polishing apparatus 10, they are deposited on an outgoing conveyor 32 which is similar to conveyor 11. It is preferred that the conveyor 32 have its upper reach disposed slightly below the plane of elongated plates 18 of conveyor belt 16 to receive the newly-polished articles.

The present arrangement of the ware in inclined relation allows setting the polishing drums at an elevation which will accept and readily surface-finish all sizes of television picture tube face plates, for example, with adequate clearance between the polishing drums and the upper support members for positive retention of the workpieces. Thus, it is not necessary to fully load the polishing mechanism with workpieces occupying the entire lineal length of the machine. The articles may be uniformly spaced or randomly spaced, as desired or required.

A further important feature of the present invention wherein the workpieces are supported in inclined relation facing the direction of travel, the drum-type polishing heads can be rotated in either direction or in alternating directions, for example, to obtain the prescribed surface finishing. No expensive mechanical devices are required to provide retention of the articles against lateral or horizontal movement. For certain types of ware, it is desirable that the leading edge of the articles be positively engaged by the juxtaposed arcuately-shaped surfaces of adjacent support members 18 as they turn over a sprocket at the inlet end of the machine. Either a slight space or no space is provided between the opposing surfaces of the article edge and the juxtaposed support members for positive retention of the articles.

The subject article supporting and conveying apparatus of this invention permits mixing different types and shapes of articles without stoppage of the machine. Uniformity of polishing over the entire viewing surface of a face plate, for example, is obtained. Random spacing of the face plates on the conveyor is possible to allow automatic loading without complex synchronizing or face plate surge storage mechanisms.

Various other modifications may be resorted to within the spirit and scope of the appended claims.

What I claim:
1. An article abrading apparatus adapted to grind and polish curved surfaces of hollow glass articles such as television picture tube face plates and the like during their conveyance therethrough, said apparatus including a series of buffing drums mounted in lineal array along the length of the apparatus, a first spray header for incoming abrasive-containing fluid disposed adjacent the article loading position of said apparatus for dispensing said abrasve-containing fluid onto the article curved surfaces, collection and return means for collecting and re-using said abrasive-containing fluid subsequent to its use, a second spray header for incoming rinsing fluid disposed adjacent the article unloading position of said apparatus, wherein the improvement comprises:
an endless conveyor belt situated longitudinally with respect to the polishing apparatus, said belt being comprised of:
a plurality of planar transversely positioned segments that are in spaced array and substantially parallel to each other, each segment having an upper horizontal surface,
a series of equidistant similarly-shaped support members arranged in spaced array and attached to said segments, said support members having:
an upper surface to support one edge of said hollow article,
and arcuately-shaped juxtaposed vertical surfaces defining the periphery of said support members and intersecting the upper horizontal surfaces of said transverse segments said vertical surfaces adapted to retain the other edge of said hollow article therebetween and to dispose the article in inclined relation beneath said series of buffing drums, and means for driving said endless conveyor belt between said loading and unloading positions.

2. An article abrading apparatus adapted to grind and polish curved surfaces of hollow glass articles such as television picture tube face plates and the like during their conveyance therethrough, said apparatus including a series of buffing drums mounted in lineal array along the length of the apparatus, a first spray header for incoming abrasive-containing fluid disposed adjacent the article loading position of said apparatus for dispensing said abrasive-containing fluid onto the article curved surfaces, collection and return means for collecting and re-using said abrasive-containing fluid subsequent to its use, a second spray header for incoming rinsing fluid disposed adjacent the article unloading position of said apparatus, wherein the improvement comprises:
an articulated endless conveyor belt having an upper reach extending substantially throughout the length of said apparatus, said belt being comprised of:
a plurality of flat elongated plates; and a series of equidistant similarly-shaped support members disposed in overlying relation intermediate the space between adjacent plates and having arcuately-shaped juxtaposed vertical surfaces adapted to retain one edge of said hollow article therebetween, the other edge being supported by the upper surface of another support member, the article thereby being disposed in inclined relation beneath said series of buffing drums; and
means for driving said endless conveyor belt between said loading and unloading positions.

References Cited

UNITED STATES PATENTS

| | | | |
|---|---|---|---|
| 2,151,909 | 3/1939 | Gould | 51—76 X |
| 2,332,992 | 10/1943 | Davis | 51—263 |
| 2,715,796 | 8/1955 | Beard | 51—76 X |
| 2,804,723 | 9/1957 | Sweeney | 51—76 X |
| 2,856,737 | 10/1958 | Evans | 51—137 |

LESTER M. SWINGLE, Primary Examiner

D. G. KELLY, Assistant Examiner

U.S. Cl. X.R.

51—216